Nov. 18, 1969 — H. G. HAHM — 3,478,849
LOW-NOISE DISK-BRAKE ASSEMBLY
Filed Dec. 22, 1967 — 2 Sheets-Sheet 1
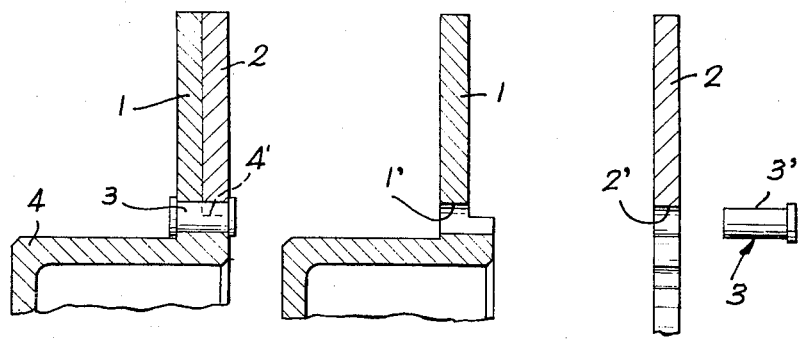
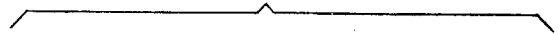
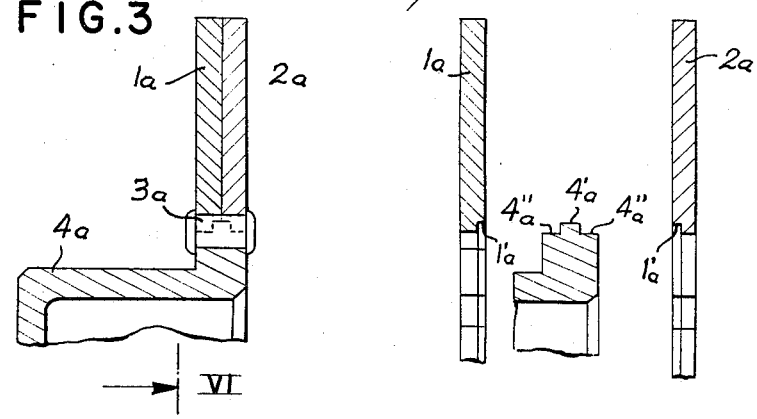
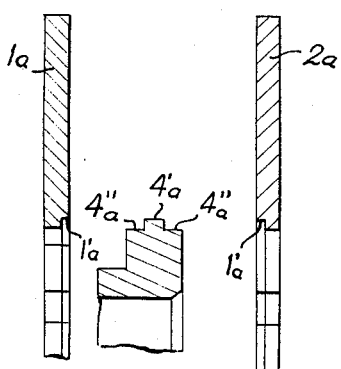
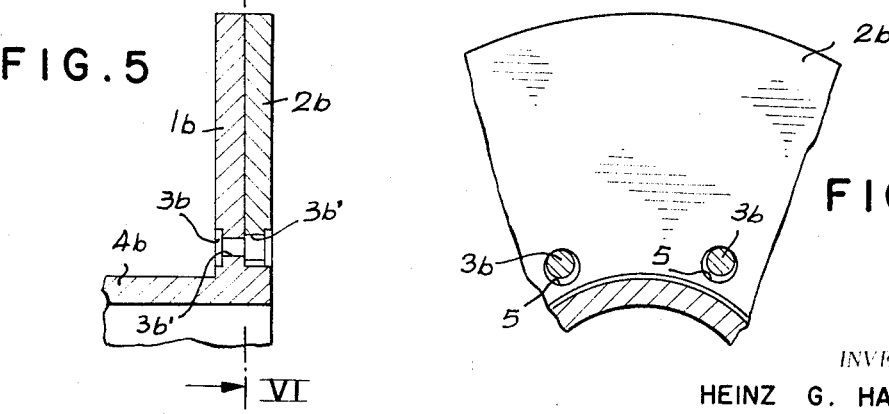
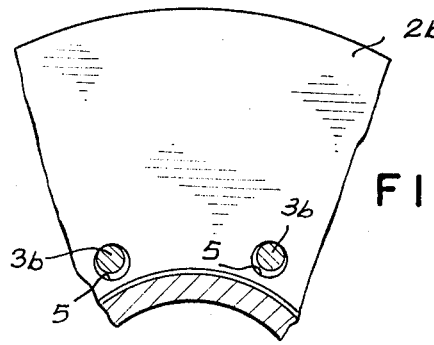
INVENTOR.
HEINZ G. HAHM
BY
Karl F. Ross
ATTORNEY Nov. 18, 1969   H. G. HAHM   3,478,849
LOW-NOISE DISK-BRAKE ASSEMBLY
Filed Dec. 22, 1967   2 Sheets-Sheet 2

HEINZ G. HAHM
INVENTOR.

BY

ATTORNEY

United States Patent Office 3,478,849
Patented Nov. 18, 1969

3,478,849
LOW-NOISE DISK-BRAKE ASSEMBLY
Heinz Günther Hahm, Frankfurt am Main, Germany, assignor to Alfred Teves G.m.b.H., Frankfurt am Main, Germany, a corporation of Germany
Filed Dec. 22, 1967, Ser. No. 692,886
Claims priority, application Germany, Dec. 23, 1966, T 32,849
Int. Cl. F16d 65/12, 69/02
U.S. Cl. 188—218
8 Claims

ABSTRACT OF THE DISCLOSURE

A disk for a low-noise disk-brake assembly having its opposite annular braking faces formed by two planar coaxial rings in back-to-back and coextensive relationship rotatably entrained by the disk hub and composed of material different from that of the hub. At least one of the rings can be composed of beryllium, ductile bronze or sintered metal oxide while the other may be formed unitarily with the hub or may be independent thereof, the rings being connected by rivets or the like with at least one ring having bores larger than the rivet shanks to accommodate different coefficients of thermal expansion of the rings. The rings may also cooperate with brake linings of different material.

My present invention relates to disk-brake arrangements and, more particularly, to improvements in disk-brake constructions designed to reduce the noise generated by the disk brake.

The increasing use of disk brakes in automotive-vehicle applications, as a consequence of their rapid response, their increased braking effectiveness and the low incidence of breakdown and minimal hydraulic fluid demand, has drawn attention to disadvantages hitherto associated with such brakes. The term "disk brake" is used herein (and generally in the automotive field) to refer to a brake system in which, by contrast with so-called internal expanding brakes using a drum-like rotary brake surface, a disk constitutes the rotating member of the brake arrangement. More specifically, a disk brake generally comprises a rotating brake disk having a hub which is connected with the wheel disk (when the disk brake is used as a vehicular wheel brake) and an outwardly extending annular flange whose opposite surfaces form annular braking faces which lie in planes transverse to the axis of rotation of the wheel and the disk. The stationary brake member is generally a yoke or housing mounted upon the vehicle chassis or some other part of the vehicle which is stationary with reference to this axis of rotation. Thus the brake yoke may have a flange which is bolted to the axle housing associated with the wheel.

The yoke extends about the periphery of the disk although enclosing only a limited segment thereof and has lobes lying on opposite sides of the disk in which respective brakeshoes are juxtaposed with the annular braking faces of the disk. The brakeshoes may be urged against the disk by respective pistons slidable in wheel-brake cylinders formed by the lobes, the pistons being movable perpendicularly to the annular braking faces of the disk. The pistons bear against rigid (e.g. steel) backing plates of the brakeshoes to bring the brake linings which are bonded to these plates into frictional engagement with the opposite flanks of the disk. The yoke thus forms a guide for the brakeshoes preventing their rotatable entrainment with the disk. It has been observed that, in practice, disk-brake systems have a tendency to generate noise at certain points in the brake-application process and also often just before total release of the brake by depressurization of the master cylinder. These noises or squeals can be eliminated in part by modifying the pistons which press the brakeshoes against the disk so as to offset the contact point between piston and backing plate from the centrum of the effective surface of the brakeshoe. Thus most of the efforts hitherto made to reduce brake noises have concentrated on modifications of the brakeshoe and the brake-actuating assembly. It has been pointed out in British Patent No. 998,453, however, that it is possible to reduce brake noises by a modification of the brake disk, more particularly by providing a copper wire in a peripheral groove in the brake disk, the copper wire being prevented from jumping out of the groove by a band extending therearound. Even this arrangement, which reduces the squealing sounds of the brake for reasons not fully understood, has not proved to be wholly satisfactory in practice because of the complicated structure, the manufacturing cost and the practical difficulties in realizing the system.

It is, therefore, the principal object of the present invention to provide a disk-brake assembly which generates reduced squeal and noise without modification of the brake-actuating arrangement and nevertheless overcomes the disadvantages of earlier systems discussed above.

Another object of my invention is to provide a brake assembly and a brake disk therefor which reduces squealing noises, is of relatively simple and inexpensive construction and which can be produced without difficulty.

I have found that these objects and others which will become apparent hereinafter, can be attained by providing, in a disk-brake assembly of the general character described, a brake disk which has its annular braking face formed by two generally planar coaxial independent rings in back-to-back coextensive relationship, the double-ring arrangement replacing the solid annular flange hitherto provided in disk brakes. This seemingly simple expedient, in which both rings are nonrotatable relatively to the disk hub, surprisingly reduces the noise generated by the disk brake although the reasons for such noise reduction are not fully understood at the present time. Tests of the brake disk have, in fact, demonstrated that no noise results when the disk is used in a disk-brake assembly in which a solid-flange disk hitherto produced noises and squeals on brake operation.

According to a more specific feature of this invention, the rings are attached to the hub so as to be nonrotatable relatively thereto. The hub, which may be a pot-shaped member attachable to the wheel disk of the vehicle, the wheel or axle hub itself or an annular flange of a differential output shaft, can be tied to the rings by splined or toothed structures, thread assemblies or riveting. While both rings may be members distinct from the hub, one of them may be formed unitarily therewith, i.e. as a single piece, while the other is attached by the indicated means. Preferably, the latter ring is secured to a ring integral with the hub by angularly spaced rivets transfixing the ring close to the hub or at least the inner periphery of the independent ring. In general, it appears that improved noise reduction results when the rings are interconnected only close to their inner peripheries.

To accommodate different degrees of thermal expansion and contraction of the rings, I provide one of the rings receiving the rivet with a bore whose diameter is slightly larger than the diameter of the shank of the rivet, thereby permitting equalization without distortion of the rings in the manner of a bimetallic element. According to a more specific feature of this invention, both rings are composed of a material different from the material from which the disk hub is constructed. Thus, for example, the hub is preferably composed of a material of high strength and easy workability, thereby allowing the hub, which can be somewhat more massive than the rings, to be manufactured in a convenient and simple manner. Suitable materials for this purpose are gray cast iron, malleable cast iron, cast steel, drawn steel plate or sheet or cast light metals, especially aluminum and aluminum alloys.

The friction rings mounted upon the hub should be composed of a material of high wear resistance and frictional coefficient, consideration being given also to the desirability of a high resistance to corrosion. I have found that best results are obtained when one or both rings are composed of beryllium, ductile bronze, sintered metal oxides (e.g. iron and/or nickel oxides), although gray cast iron and steel sheet or plate may also be used. The or both independent rings preferably are made from beryllium, ductile bronze or metal oxides which are of greatest desirability from the viewpoint of the frictional coefficient but have not found practical application heretofore because of their high cost. Furthermore, the rings may be composed of materials different one from the other; for example, the friction ring on the side of the disk toward which the pot-shaped hub extends, may be composed of gray cast iron while the ring mounted on the hub is composed of ductile bronze. This construction wherein the friction rings of the disk are composed of different materials, not only has the advantage that best noise-reducing results are obtained, but also permits the brake linings on the opposite sides of the disk to be different from one another. The brake lining engageable with the ductile-bronze ring, thus can be a sintered metal or inorganic lining, preferably a sintered bronze, while the lining engageable with the friction ring composed of gray cast iron can have an organic base or binder, e.g. a phenol-formaldehyde resin containing asbestos fibers. The brake disk may also be formed with air scoops to promote the cooling of the brake (see U.S. Patents 3,184,023 and 3,295,640). Another advantage of the present system is found in the fact that the brake lining can be selected for optimum frictional characteristics and that materials can be used which have hitherto been consider unsatisfactory because of their noise-generating tendencies. Furthermore, the bipartite flange, especially when composed at least in part of ductile bronze or beryllium, has a significant ability to dissipate heat, thereby improving the thermal charactertistics of the brake.

The above and other objects, features and adavntages of the present invention will become more readily apparent from the following description, reference being made to the accompanying drawing in which:

FIG. 1 is a fragmentary axial cross-sectional view of a brakeshoe embodying the present invention;

FIG. 2 is an exploded view thereof;

FIG. 3 is a view similar to FIG. 1 of another embodiment;

FIG. 4 is an exploded view thereof;

FIG. 5 is a view similar to FIG. 1 of still another modified arrangement;

FIG. 6 is a view taken along the line VI—VI of FIG. 5; and

Figure 7:
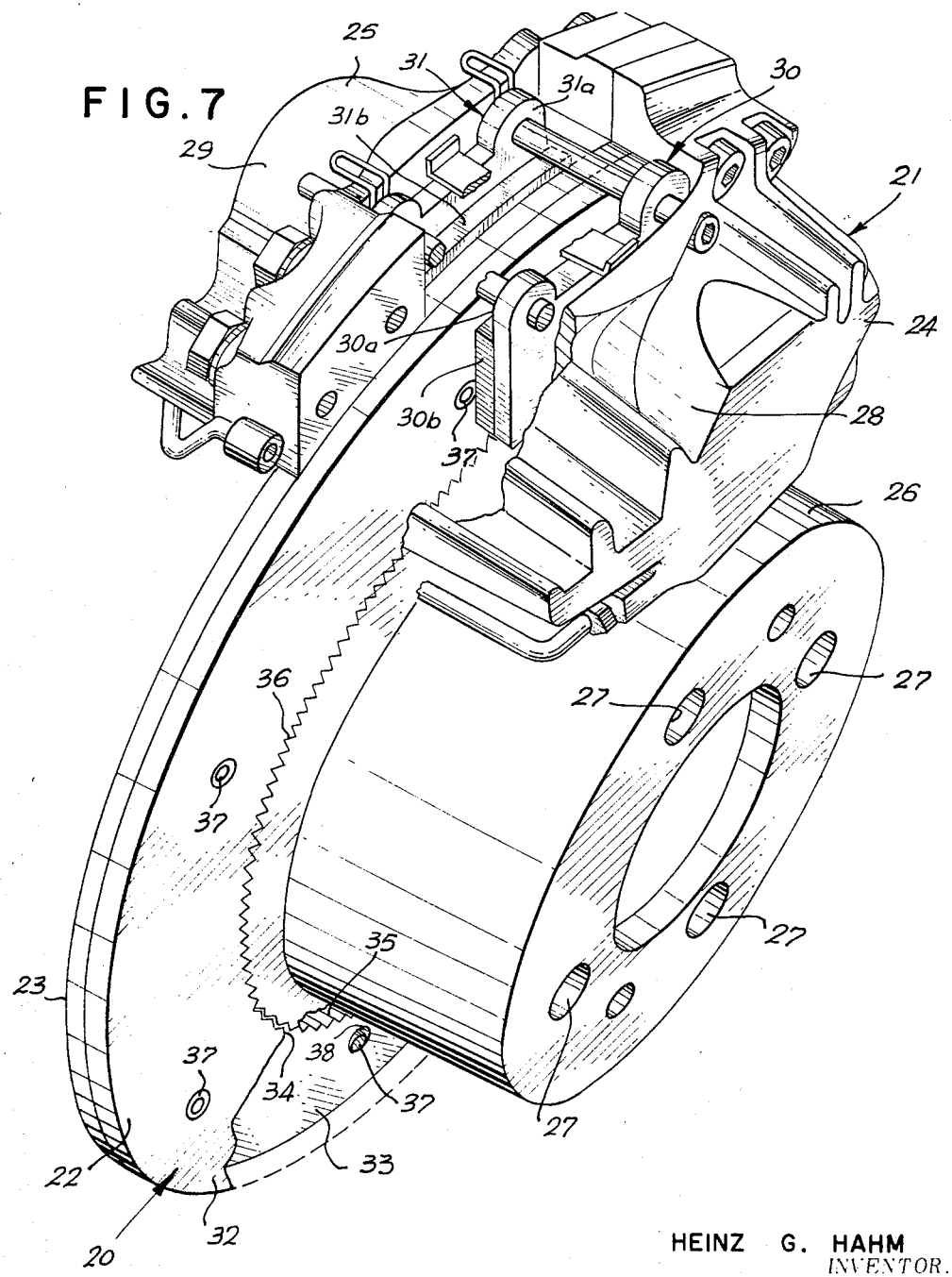
FIG. 7 is a perspective view of a disk brake embodying the present invention.

Referring first to FIG. 7 in which an overall view, partly broken away, of a disk brake is shown, it can be seen that a vehicular disk brake generally comprises a brake disk 20 which passes through a brake yoke 21 and has a pair of annular braking faces 22 and 23 respectively flanked by the lobes 24 and 25 of the yoke. The lobe 25 may be connected to the axle housing while the disk 20 has a pot-shaped hub 26 with bores 27 through which the axially extending bolts of the axle-shaft flange may pass when the disk is mounted as a wheel brake. The tire-carrying wheel disk is then secured to the hub 26 by these bolts and the usual nuts. The lobes 24 and 25 are provided with respective wheel-brake cylinders 28 and 29 which are hydraulically energizable by the vehicle master cylinder to urge the brakeshoes 30 and 31 against the faces 22 and 23 of the disk. The brakeshoes comprise steel backing plates 30a, 31a to which are bonded the brake linings 30b, 31b. As noted earlier, these linings may be composed of different materials when the rings are of different materials. Unlike the usual brake disk, the disk 20 comprises a pair of rings 32 and 33 which are formed with teeth along the inner peripheries 34 and 35 which engage matingly the external peripheral teeth 36 of the hub to ensure rotatable entrainment of the rings 32 and 33 with the hub 26. The rings 32 and 33 are secured in back-to-back relationship by rivets or bolts 37 as will be described in greater detail hereinafter, at least one of the rings (in this case ring 33) having holes 38 for the rivets which are somewhat larger to accommodate differences in the thermal expansion and contraction of the rings. In this system, the rings are composed of different materials from the hub 26 and a difference in material is provided between the rings as well. While the hub 26 may be composed of malleable cast iron, gray cast iron, cast steel, drawn steel plate or cast aluminum, I prefer to use cast steel here. The ring 33 is here composed of gray cast iron although beryllium, ductible bronze, sintered metal oxide or steel plate may also be employed. Ring 32 may be composed of the same materials as ring 33, although here it is made of ductile bronze. The brake lining 30b confronting the ductile bronze ring 32 is an inorganic sintered material, i.e. sintered bronze, while the brake lining 31b confronting the gray cast iron ring 32 is an organic-based brake lining as previously described.

From FIGS. 1 and 2, it can be seen that the pot-shaped hub 4 is unitarily integral (in one piece) with the planar friction ring 1 and forms a boss 4' along the inner periphery of this ring 1. The other frictional ring 2 is seated on the boss 4' and is secured to ring 1 by a rivet 3. To this end, semicircular recesses 2' are provided along the inner periphery of the ring 2 and are aligned with the angularly equispaced bores 1' to receive the rivets 3. As illustrated in FIGS. 6 and 7, the passages 1' or 2' can be enlarged relatively to the shank 3' of the ring to accommodate thermal expansion. Instead of a pot-shaped hub 4 of the disk, the ring 1 can be formed unitarily with a flange of a differential shaft driving the rear axles of the vehicle or with the hub of the wheel or its shaft. In the embodiment of FIG. 2, the hub 4 and the friction ring 1 are composed of the same material, preferably gray cast iron, steel plate or cast light metal. Ring 2 is composed of another material, preferably beryllium, ductile bronze or sintered metal oxide. The brake linings flanking the rings 1 and 2 may have the composition of lines 31b and 30b previously described.

In the embodiments of FIGS. 3 and 4, a pair of independent friction rings 1a and 2a is provided, the rings being joined by rivets 3a angularly equispaced about the hub 4a as described in connection with FIGS. 1 and 2. Here, however, the hub 4a has an upstanding ridge 4a' flanked by bosses 4a", upon which the coextensive rings 1a and 2a are mounted, the ridge 4a' being received in an annular recess 1a' to limit axial movement of the rings 1a and 2a relatively to the hub 4. In this embodiment, the hub 4a is composed of a material different from that of the rings (see the description of FIG. 7).

In FIGS. 5 and 6, I show still another arrangement in which the ring 1b is integral unitarily with the hub 4b while the ring 2b has a coefficient of thermal expansion different from that of the ring 1b. In this case, the rivets 3b pass through the bore 1b' in the ring 1b but are received in bores 5 of ring 2b which have a larger diameter than that of the rivet shank 3b' to accommodate radial expansion and contraction of the ring 2b relative to ring 1b.

I claim:

1. In a disk-brake assembly, the improvement which comprises a rotatable brake disk having a hub portion, two planar coaxial coextensive rings in back-to-back relationship defining respective annular braking faces, and fastening means for securing at least one of said rings to said hub portion, both said rings being nonrotatable relatively to said hub portion, said hub portion being formed as a pot-shaped body composed of a metal selected from the group which consists of malleable cast iron, gray cast iron, cast steel, steel plate and light metal, one of said rings being composed of a metal selected from the group which consists of gray cast iron, beryllium, ductile bronze, a sintered metal oxide and steel plate, the other of said rings being composed of a material different from that of said one of said rings and selected from the group which consists of beryllium, ductile bronze and sintered metal oxide, said fastening means being constituted by a plurality of angularly spaced rivets transfixing said rings along the inner peripheries thereof, one of said rings having respective bores receiving said rivets and of a diameter slightly larger than that of the shanks of said rivets, said assembly further comprising a brake yoke extending around the periphery of said disk and having a pair of brakeshoes on opposite sides of said rings for engagement with the respective annular face thereof, the brakeshoe engageable with said one of said rings having an organic-base brake lining, the brakeshoe engageable with said other of said rings having a sintered-bronze lining.

2. In a disk-brake assembly, the improvement which comprises a rotatable brake disk having a hub portion, two planar coaxial coextensive rings in back-to-back relationship defining respective annular braking faces, and fastening means for securing at least one of said rings to said hub portion with play in the plane of said one ring but rotatably entraining same with said hub portion; at least one of said rings being composed of a material different from that of said hub portion, said hub portion being composed of a metal selected from the group which consists of gray cast iron, malleable cast iron, cast steel and light metal, and said one of said rings being composed of a metal selected from the group which consists of beryllium, ductile bronze and a sintered metal oxide.

3. The improvement defined in claim 2 wherein said fastening means includes rivets angularly spaced about said hub portion and transfixing said rings along the inner peripheries thereof said one of said rings being provided with bores receiving said rivets and of a diameter larger than that of the shanks of the rivets to accommodate different degrees of thermal expansion of said rings.

4. The improvement defined in claim 3 wherein one of said rings is formed unitarily with said hub portion.

5. The improvement defined in claim 3 wherein said hub portion and said one of said rings are provided with mating teeth limiting relative rotation between said one of said rings and said hub portion.

6. In a disk-brake assembly, the improvement which comprises a rotatable brake disk having a hub portion, two planar coaxial coextensive rings in back-to-back relationship defining respective annular braking faces, and fastening means for securing at least one of said rings to said hub portion, both said rings being nonrotatable relatively to said hub portion, at least one of said rings being composed of a material different from that of said hub portion, said hub portion being composed of a metal selected from the group which consists of gray cast iron, malleable cast iron, cast steel and light metal, said one of said rings being composed of a metal selected from the group which consists of beryllium, ductile bronze and a sintered metal oxide, and the other of said rings is composed of gray cast iron.

7. The improvement defined in claim 6 wherein said assembly has a pair of brakeshoes with respective linings juxtaposed with and engageable with said annular braking faces of said rings, the lining engageable with said one of said rings being composed of an inorganic material, the lining engageable with said other ring having an organic base.

8. The improvement defined in claim 7 wherein said lining engageable with said one of said rings is composed of sintered bronze.

References Cited

UNITED STATES PATENTS

| 2,765,881 | 10/1956 | Pierce | 188—218 |
| 2,902,130 | 9/1959 | Halberg et al. | |
| 2,989,153 | 6/1961 | Boulet | 188—218 |
| 3,221,853 | 12/1965 | Batchelor et al. | 192—107 X |
| 3,361,228 | 1/1968 | Nectoux | 188—218 |

FOREIGN PATENTS 1,031,138  3/1953  France.

GEORGE E. A. HALVOSA, Primary Examiner

U.S. Cl. X.R.

188—251; 192—107